United States Patent [19]

Darracq et al.

[11] Patent Number: 4,948,676
[45] Date of Patent: Aug. 14, 1990

[54] CERMET MATERIAL, CERMET BODY AND METHOD OF MANUFACTURE

[75] Inventors: Dominique Darracq, Ville-la-Grand, France; Jean-Jacques Duruz, Geneva, Switzerland

[73] Assignee: Moltech Invent S.A., Luxembourg

[21] Appl. No.: 332,850

[22] PCT Filed: Aug. 19, 1987

[86] PCT No.: PCT/EP87/00470

§ 371 Date: Feb. 15, 1989

§ 102(e) Date: Feb. 15, 1989

[87] PCT Pub. No.: WO88/01311

PCT Pub. Date: Feb. 25, 1988

[30] Foreign Application Priority Data

Aug. 21, 1986 [CH] Switzerland .................. 86810372

[51] Int. Cl.⁵ .................................................. B32B 7/00
[52] U.S. Cl. ................................ 428/539.5; 75/232; 75/234; 75/235; 419/19; 419/20; 419/21; 419/22; 419/45
[58] Field of Search ............... 428/539.5; 75/232, 234, 75/235; 419/19, 20, 21, 22, 45

[56] References Cited

U.S. PATENT DOCUMENTS

| | | | |
|---|---|---|---|
| 3,926,567 | 12/1975 | Fletcher et al. | 29/182.5 |
| 3,953,177 | 4/1976 | Sedlatschek et al. | 29/182.5 |
| 4,183,746 | 1/1980 | Pearce et al. | 75/234 |
| 4,278,729 | 7/1981 | Gibson et al. | 428/368 |
| 4,454,015 | 8/1984 | Ray et al. | 204/293 |
| 4,540,475 | 10/1985 | DeAngelis | 204/67 |
| 4,584,172 | 4/1986 | Ray et al. | 419/34 |
| 4,610,726 | 9/1986 | King | 75/233 |
| 4,614,569 | 9/1986 | Duriz et al. | 204/67 |
| 4,623,388 | 11/1986 | Jatkar et al. | 75/232 |
| 4,689,077 | 8/1987 | Chevigne et al. | 75/233 |
| 4,715,892 | 12/1987 | Mahulikar | 75/233 |
| 4,726,842 | 12/1988 | Reeve et al. | 75/244 |

Primary Examiner—Stephen J. Lechert, Jr.
Assistant Examiner—Ngoclan T. Mai
Attorney, Agent, or Firm—John J. Freer

[57] ABSTRACT

The present invention provides a ceramic/metal composite material comprising cerium/aluminum mixed oxides as the ceramic phase and an alloy or intermetallic compond of cerium and at least one of aluminum, nickel, iron and cobalt as the metal phase. The ceramic phase may comprise interengaged crystal lattices of ceria and alumina. The material may be a self-sustaining body which may be used as substrate for a dimensionally stable anode in molten sale aluminum electrowinning cells, coated with a protective layer of cerium oxyfluoride in situ during electrolysis in molten cryolite containing cerium ions.

27 Claims, 2 Drawing Sheets

CERMET MATERIAL, CERMET BODY AND METHOD OF MANUFACTURE

FIELD OF INVENTION

The present invention relates to ceramic/metal composite materials having at least one ceramic phase and at least one metallic phase. This invention further relates to a body of the ceramic/metal composite material and to a method of its manufacture.

BACKGROUND ART

Composite materials comprising ceramic and metallic phases, generally referred to as cermets, are known from numerous publications. Such materials are used in a wide variety of applications and their specific composition, structure and other physical and chemical properties may be adapted to the specific intended use.

Among the known types of cermets are those which comprise metal oxides as ceramic phase with a different metal or the same metal as the metallic phase. An example is given in EP-A-0 072 043 which describes a cermet comprising alumina and aluminum. This cermet is proposed for use as a component covered with molten aluminum in fused salt aluminum electrowinning cells. This reference also mentions (page 5, line 30) that the alumina phase may include further oxides which do not readily react with aluminum. The metallic phase may either be pure aluminum or an alloy of aluminum with other metals such as mentioned on page 3, lines 5-32.

It has already been proposed to include cerium compounds in ceramic materials used as components in aluminum production cells. Such developments are described e.g. in EP-A-0 115 689, which discloses a ceramic body fabricated by reaction sintering $CrO_3$ and $CeB_2$ to yield a mixture of ceria and $CrB_2$.

U.S Pat. Nos. 4,454,015 and 4,584,172 have subsequently disclosed various reaction-sintered cermets such as Fe/Ni oxide as ceramic phase with iron, nickel or an iron/nickel alloy as the metallic phase. These cermets were proposed for dimensionally stable anodes in molten salt electrowinning.

EP-A-0 114 085 discloses aluminum electrowinning with a cerium compound dissolved in the molten cryolite electrolyte so that during electrolysis a protective coating of a fluorine-containing oxycompound of cerium referred to as "cerium oxyfluoride" is produced on the anode surface. The anode substrate to be plated with the cerium oxyfluoride was for example $SnO_2$, but other substrates were also proposed such as electrically conductive and essentially corrosion resistant materials which, in addition, may contain or be precoated with cerium as metal, alloy or intermetallic compound with at least one other metal, or as compound. The substrate may in particular be a conductive ceramic, cermet, metal, alloy or an intermetallic compound.

OBJECTS OF THE INVENTION

It is an object of the present invention to provide a new type of cermet material comprising cerium and a cerium-containing oxide.

It is also an object of the present invention to provide a ceramic/metal composite material capable of being plated with a cerium oxyfluoride coating during electrolysis of alumina dissolved in molten cryolite containing small amounts of cerium ions.

It is another object of the present invention to provide a substrate for an anode for a molten salt aluminum electrowinning cell which provides sufficient electrical conductivity to economically operate the electrowinning cell and which, once coated with cerium oxyfluoride, is dimensionally stable during long periods of operation.

It is a further object of the present invention to provide an electrically conductive ceramic/metal composite material which may be used as a component in a molten salt aluminum electrowinning cell and which does not produce harmful corrosion products that contaminate the electrowon aluminum.

It is a still further object of the present invention to provide a material which, when coated with cerium oxyfluoride, provides s self-healing effect for this coating subsequent to damage or the occurence of imperfections.

SUMMARY OF INVENTION

The above and other objectives of the present invention are attained with a ceramic/metal composite material of at least one ceramic phase and at least one metallic phase, comprising mixed oxides of cerium and at least one of aluminum, nickel, iron and copper in the form of a skeleton of interconnected ceramic oxide grains interwoven with a metallic network of an alloy or an intermetallic compound of cerium and at least one of aluminum, nickel, iron and copper. For the application of this composite material as component in an aluminum electrowinning cell aluminum is the preferred alloying component and aluminum oxide is contained in the ceramic phase. In this case, minor amounts of nickel, iron or copper may also be present in the metallic phase and/or in the mixed oxide ceramic phase. Nickel, iron and/or copper may be the preferred alloying component for uses outside the aluminum electrowinning field. Although it is believed that the ceramic phase is present as a mixed oxide, a mixture of oxides of the above metals may also be present.

Such interwoven composite material may additionally comprise inert reinforcing fibers or tissues for example of carbon, alumina, ceria, zirconia or possibly silica and so forth.

The molar ratio between cerium and aluminum in the mixed oxide phase can vary within a large range of composition such as between 9:1 and 1:9. However, it may preferably be chosen between 2:1 and 1:5 and more specifically between 1:1 and 1:2. Although this ratio is essentially constant throughout each grain, it may vary from one grain to another within the above mentioned ranges.

Thus, the ceramic grains of preferred composite materials according to the present invention may be constituted by crystals of mixed oxides in which essentially three different stoichiometries are present. The dominant type of grains follows the formula $Al_2O_3.Ce_2O_3$, a minor type follows the formula $2Al_2O_3.Ce_2O_3$ and another minor type in smaller quantity follows the formula $3Al_2O_3.2Ce_2O_3$. Thus, the Al/Ce molar ratio in the first type of grains equals 1:1, in the second type of grains 2:1 and in the third type 3:2. Amounts of pure $Ce_2O_3$ and $Al_2O_3$ and possibly small amounts of $CeO_2$ may also be present. Each of these oxides may be present in its pure state or doped with fluorine. The ceramic phase may also comprise sulphides, nitrides or phosphides of cerium and optionally aluminum and the metallic phase may additionally comprise silver and/or at least one noble metal selected from gold, platinum, iridium, osmium, palladium, rhodium and ruthenium.

The ceramic phase of the composite material according to the present invention may be doped, preferably with pentavalent dopants, to increase its electrical conductivity and in some cases to improve its catalytic activity with respect to a chemical reaction occurring at its surface when used as an electrode in an electrolytic process.

Suitable dopants e.g. for improving the electrical conductivity include at least one of tantalum and niobium. Additions of $AlB_2$, $AlB_{12}$ $TiB_2$, $CeB_4$, $CeB_6$, TiN and CeN may be used, as discussed below, to assist densification. Some of these densification aids also increase the electrical conductivity of the ceramic phase.

The introduction of dopants to improve the electrical conductivity of the coating has been mentioned in EP-A-0 114 085. However, no particular dopants were identified. European Patent Application EP-A-0 203 884, published on 3rd December 1986 describes the inclusion of yttrium, lanthonium, praesodymium and other rare earths in the cerium oxyfluoride coating as dopants. A copending application filed simultaneously herewith (Ser. No. 328,361) discloses doping with tantalum, niobium and other pentavalent metals. These additions cause the formation of a denser, more impervious structure and also an improvement of the electrical conductivity. However, these patent applications do not deal with the production of a cermet but concern a ceramic material which is produced as a coating on a substrate by anodic deposition of cerium oxyfluoride during electrolysis of molten cryolite such as described in EP-A-0 114 085, or in some cases may be produced by sintering.

The doping of the ceramic phase of the present cermet with tantalum, niobium or other pentavalent dopants may be obtained by adding to the precursor mixture a suitable amount of $Ta_2O_5$, $Nb_2O_5$ and/or other pentavalent oxides or fluorides. The amount of $Ta_2O_5$ and/or $Nb_2O_5$ or other pentavalent oxides added to the precursor mixture for this purpose may be up to 5 mole %, preferably approximately 1 mole % of the ceramic phase.

The cerium in the ceramic phase may be present as a mixture of $Ce^{3+}$ and $Ce^{4+}$ ions.

The metallic phase may comprise $CeAl_2$ but variations in the ratio between Ce and Al departing from the ratio of this intermetallic compound are possible. Such variations include e.g. CeAl, $CeAl_3$, $Ce_3Al_{11}$ and solid solutions. The overall atomic ratio between cerium and aluminum in the metallic phase comprising one or more intermetallic compounds and/or solid solutions may vary within a large range such as between 9:1 and 1:9. However, it is preferably in the range between 2:1 and 1:5 and even more preferably between 1:1 and 1:2.

The composite material according to the present invention may constitute a self-sustaining body, a particulate, a coating or it may have other physical forms.

In the application of the material as a component, in particular an anode, for aluminum electrowinning this material may constitute a substrate body which is coated with a surface layer of cerium oxyfluoride.

The methods of manufacturing a material or body according to the present invention comprise reactive sintering, reactive hot-pressing and reactive plasma spraying of a precursor mixture comprising powders of aluminum and/or cerium or an aluminum/cerium alloy and at least one compound preferably selected from $CeO_2$, $Ce_2O_3$, $AlF_3$ and $CeF_3$.

When a highly densified ceramic/metal composite body is desired, at least one densifying agent selected from $AlB_2$, $AlB_{12}$, $TiB_2$, $CeB_4$, $CeB_6$, TiN, CeN, BN, $SiB_4$ and $SiB_6$ may be added to the precursor mixture, preferably in an amount up to 10 weight %. Whereas the last three of these agents are non-reactive in the considered chemical reactions and only aid the densification of the final composite body, the first mentioned ones are reactive and undergo chemical transformations. The non-reactive additives BN, $SiB_4$ and $SiB_6$ are also electrically non-conductive and therefore do not contribute to the conductivity of the final body. However in addition to their densification effect, they act as an agent protecting the composite material against oxidation.

The body or material according to the present invention may be sintered or pressed at temperatures between 800° C. and 1800°; however, certain mixtures of precursors may be heat treated at lower temperatures.

The present invention further relates to the use of a body as described above as substrate to be plated with cerium oxyfluoride e.g. by anodic deposition in molten cryolite, by sintering of particulate cerium oxyfluoride, by reaction sintering of a suitable powder mixture such as cerium oxide and cerium fluoride on the preformed substrate, by painting and curing, by plasma spraying or other known techniques, and to the further use of the coated substrate as a dimensionally stable anode for aluminum electrowinning in a molten salt electrolysis cell.

DETAILED DESCRIPTION OF THE INVENTION

Figure 1:
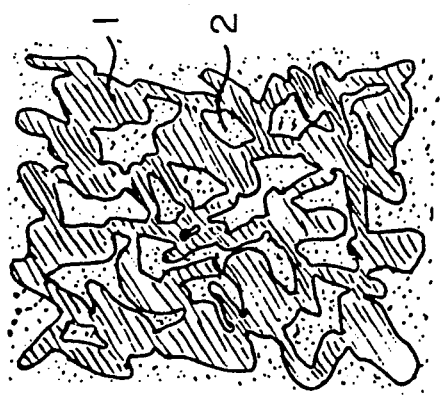
FIG. 1 is a schematic graphic reproduction of the structure of a fracture surface of a composite material according to the invention.

The present invention is described in the following with reference to one preferred embodiment as to its fabrication process. This preferred embodiment uses a reactive hot-pressing technique, but it is to be understood that the same or similar materials may be obtained by other reactive sintering techniques, by reactive plasma spraying or other methods.

In order to obtain a solid, self-sustaining body of the material according to the invention, a precursor mixture of powders is submitted to conditions under which a chemical reaction occurs which yields the reaction products constituting the chemical composition of the desired composite material, and which simultaneously densify this reaction product to provide a solid body.

The material according to the present invention comprises a ceramic phase constituted by oxides of aluminum and cerium, in which the ratio between these two oxides may vary from one grain to the other. A high percentage of grains comprise both alumina and ceria in equal mole ratio, which corresponds to a composition of the formula CeAlO$_3$. A smaller percentage of the grains comprises a composition in which the ratio between alumina and ceria is 2:1 and a still smaller part of the grains comprises an alumina-ceria ratio of 3:2.

Since the composite body comprises a mixture of oxides of cerium and aluminum as the ceramic phases and an alloy of cerium and aluminum as the metallic phase, it is obviously necessary to provide precursor powders which contain aluminum, cerium and optionally oxygen, in any desired state. Thus, it is possible to use fine powders of metallic aluminum and cerium and at least one oxygen containing compound, or an oxide of one of these metals and the other metal in metallic state or oxides of both metals, provided that the chemical reaction includes a reducing component either as volatile additive or as a gaseous environment in which the reaction is carried out. The precursor mixture may also comprise only metallic powders or non-oxidic compounds of the mentioned metals, such as fluorides, provided the reaction is carried out in an oxidizing environment to produce oxides of those metals.

According to a preferred embodiment, however, at least one of aluminum and cerium will be present in the precursor mixture as a metallic powder. Other possible components of the basic precursor mixture are at least one of CeO$_2$, Ce$_2$O$_3$, CeF$_3$, AlF$_3$, AlB$_2$, AlB$_{12}$, Al-silicides and others.

The precursor mixture, after pretreatments including selection of the grain size distribution and removal of moisture, is compacted to provide a sufficient green strength and reactivity and heated to a temperature at which the reaction is initiated. In embodiments where metallic precursors are used, this reaction is exothermic and the heat released makes the reaction self-sustaining until substantially all precursor is reacted. Other cases are possible, however, where no or only a limited amount of reaction heat is produced, which necessitates continuous heating of the reactants until the reaction is completed.

Pressures applied during initial compaction or during the reaction in the case of reactive hot-pressing are in the range of 100–10000 kg/cm$^2$, depending on the nature of the precursor materials. In processes where melting of one of the starting or final components is involved, the pressures should not be too high, in order to avoid the loss of liquid under the compressive forces. The temperature to which the precursor mixture is heated to initiate the desired chemical reaction also depends on the materials used as precursors and on the desired product structure, since the grain structure of the final product may largely be influenced by the temperature and the duration of the heating period as well as by the heating rate. The preferred temperature is in a range between approximately 800° C. and 1800° C., depending on the used mixture.

The desired physical properties of the final body depend, of course, on the intended use of this body. In the following the invention is discussed with respect to the use of this material as a substrate for an aluminum electrowinning anode which is plated with a coating of cerium oxyfluoride in-situ during initial operation or, alternatively, by any other coating process outside the electrowinning cell prior to use. It may be desired to provide a material comprising substances which catalyze the formation of a surface coating, such as is the case when cerium, dissolved in the cryolite, is deposited onto the surface.

Another advantage of the preferred embodiments of the material according to the invention when used as an anode substrate in an aluminum production cell is that they essentially only contain elements which are already present in the liquid contents of the cell, and thus do not contaminate the electrowon aluminum if there are imperfections of the protective cerium oxyfluoride anode surface coating. In case of damage to this coating, before the self-healing effect of re-deposition of cerium oxyfluoride re-establishes the protection of the anode substrate, small amounts of the substrate may be corroded and dissolved in the molten cryolite, which would lead to contamination of the liquid cell contents if the anode substrate comprised contaminating substances. Such contamination effects have been observed when substrates such as SnO$_2$ have been used under the cerium oxyfluoride protective coating.

Physical properties required for this use of the material according to the present invention include electronic conductivity, mechanical strength as well as sufficient density and corrosion resistance to withstand immersion in molten cryolite during the initial period before the protective cerium oxyfluoride is formed on its surface.

The electronic conductivity of the material as described is substantially confined to metallic parts of the composite structure which in effect has finely distributed interconnected channels of metallic conductivity. However, as will be apparent in the following, a degree of electronic conductivity is also desirable for the ceramic phase.

The pure cerium and aluminum oxides constituting the ceramic phase or phases are believed to have a kind of semiconductor behaviour which provides a degree of electronic conductivity at the temperature at which a molten salt aluminum electrowinning cell is operated. However, higher conductivity is desired and the above mentioned pentavalent dopants provide this by shifting electrons into the conductivity band of the mixed alumina-ceria crystals.

Suitable substances to obtain doping of the crystal structure of the aluminum/cerium mixed oxides are e.g. Ta$_2$O$_5$ or Nb$_2$O$_5$. These dopants will essentially be present in the ceramic phase, but small inclusions thereof in the metallic phase may be admitted. Oxides of other pentavalent metals or additions of any of the above mentioned additives also increase the electrical conductivity. Small amounts of these dopants in the order of approximately 1 mole % of the ceramic phase are sufficient for the above purpose.

Another of the above-mentioned physical properties of the composite material is the bulk density. Pressing of the precursor mixture and, in particular, pressing during the reaction provides favorable conditions to obtain high density. However, it may be desired to further increase the bulk density. To this end, densification aids which promote densification during the heat treatment may be added to the precursor mixture. Such aids may be selected among AlF$_3$, CeF$_3$, cryolite, AlB$_2$, AlB$_{12}$, TiB$_2$, CeB$_4$, CeB$_6$, TiN, CeN , BN, Al-silicides, SiB$_4$ and SiB$_6$. Of these, CeB$_6$ and AlB$_2$ are preferred. Whereas additives such as AlF$_3$ actually participate in the chemical reaction, CeF$_3$ remains inert but may, according to the temperature, be in the molten state. Thus, it may act as a transportation medium for cerium and oxygen species which are dissolved in it. The fusion point of CeF$_3$ is 1460° C., so reactions taking place above this temperature may include this densification effect. Further, the vapour pressure of CeF$_3$ is relatively high: thus, evaporated and redeposited CeF$_3$ may also contribute to the formation of the composite material.

Some of these densification aids are assumed to deposit at the grain boundaries and provide, at the considered temperatures, a lubrification effect which promotes compaction of the grains. Thus, higher densities may be obtained.

The microstructure of the final product according to the present invention comprises, as discussed below, two phases which are both interconnected or essentially continuous and which are interwoven with each other. The structure may be compared with a sponge, wherein the solid, elastic material represents the ceramic phase and the open pores, receiving liquid, represent the metallic phase. Thus, high mechanical strength is provided by the interconnected ceramic phase and ductility, machineability and in particular electrical conductivity are provided by the continuous metallic phase.

When used in molten cryolite to be plated with a coating of cerium oxyfluoride, the metallic phase, of course, must still be in solid state. Al$_2$Ce, the preferred metallic phase for this purpose, melts at approximately 1360° C. and is therefore solid at the operating temperature of a molten salt aluminum electrowinning cell, which in general is around 1000° C.

EXAMPLE

The invention is now described by way of an example relating to the production of the material by a reactive hot-pressing technique.

32g of mixed CeO$_2$/Al powder containing 82.7 weight % CeO$_2$ of a grain size between 25 and 35 micrometers (FLUKA AG, of purity higher than 99%) and 17.3 weight % of aluminum (CERAC, of 99.5% purity, 325 mesh) were cold pressed at 32 megapascals to yield a green body having a density of 57% of theoretical density. The body was hot pressed under 20 megapascals at 1150° C. for one hour and at 1250° C. for another hour.

The consolidated final body had a density of 75% of theoretical density, substantially all pores being closed.

Figure 2:
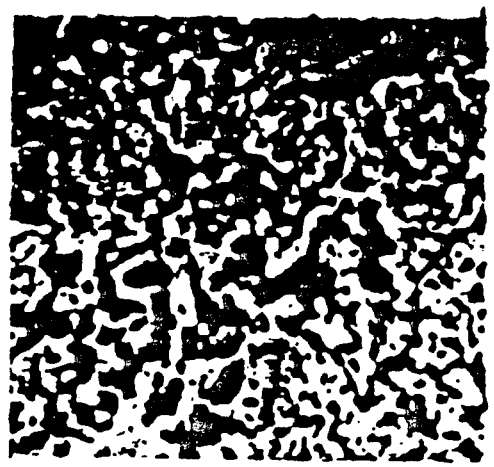
FIG. 2 is an illustration of microphotograph of a polished cut surface of a material according to the invention.

This sample had a porous core (the pores had dimensions from 20–50 micrometers) surrounded by a denser body containing only closed macropores. Both of these regions had similar microstructure, ie. a finely dispersed quasi continuous network of cerium aluminate impregnated with a metallic Al$_2$Ce matrix. The ceramic phase consisted of a very finely interconnected grain structure of vermicular or leaf-like grains having a length dimension of 5–10 micrometers and a cross dimension of 1–2 micrometers. FIG. 2 is a microphotograph of a polished cut surface of the body according to the present Example.

DETAILED DESCRIPTION OF THE DRAWINGS

FIG. 1 is an idealized illustration of a surface of fracture of the material according to the present invention wherein the fracture occurred along the grain boundaries as opposed to FIG. 2 which represents a cut through the grains. FIG. 1 represents the shape of the grains 1 as elongated, and leaf-like. The interstices 2 between these grains 1 are filled with a continuous metallic network. The loosely packed leaf-like grains 1 which correspond to the white areas in FIG. 2 are mechanically connected one to the other so as to provide a continuous ceramic skeleton which provides the desired strength. For the discussion of the following Figures and in particular in view of the formation of a cerium oxyfluoride coating on the illustrated material, it is specifically the metallic phase which is of interest.

Figure 4:
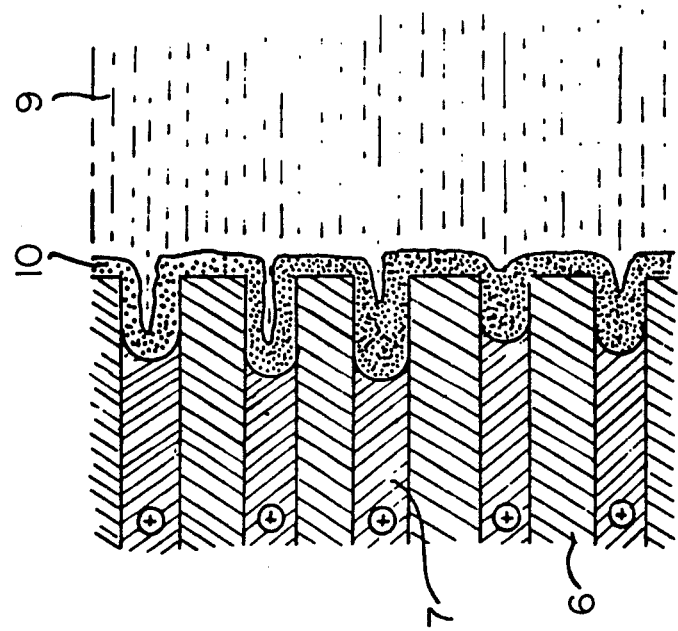
FIG. 4 is a schematic illustration of the body according to the invention comprising a coating of cerium oxyfluoride.
Figure 3:
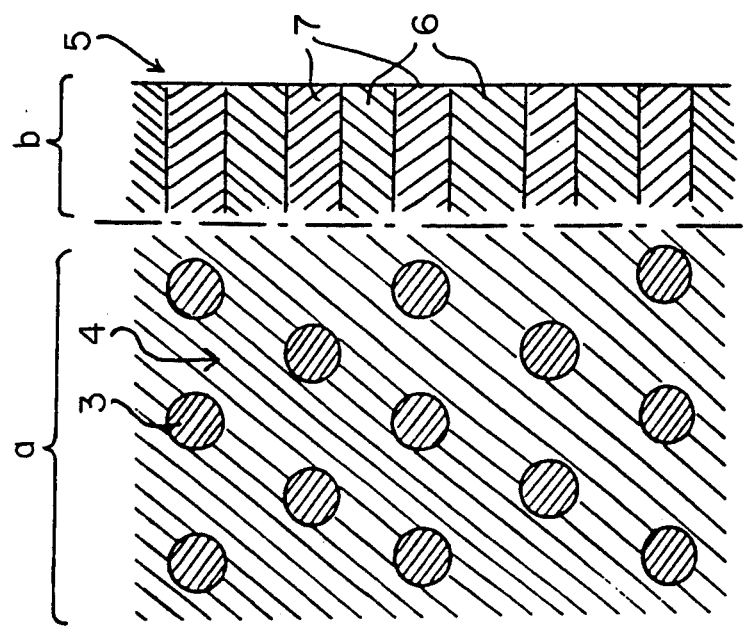
FIG. 3 is a geometrically idealized diagram of FIG. 1 in front view (a) and side view (b)

The metallic phase, comparable to the interconnected voids of a sponge, provides an array of continuous paths for electrical current, which paths are separated from each other by ceramic portions. FIG. 3, part (a) is a further simplified presentation of the discussed structure wherein these metallic current paths are designed as regular cylinders 3, running through the ceramic phase 4. It is clear that in reality the structure is far from being regular such as represented in FIGS. 3 and 4, but for convenience of understanding the following plating process this representation may be of advantage.

Referring to FIG. 2, a sintered cylinder produced according to the Example was cut perpendicular to its length dimension, polished and investigated under a scanning electron microscope.

FIG. 2 is a reproduction of a microphotograph obtained from the cut surface of this cylinder. It shows an interwoven network of black and white areas. The white areas represent the ceramic phase and the black ones the metallic phase. The white ceramic areas have a generally elongated, leaf-like configuration approximately 1–5 micrometers thick and 5–10 micrometers long. It is well apparent that the white areas are interconnected and therefore provide a continuous phase formed as a ceramic skeleton of high mechanical strength. In order to represent the material's microstructure, the reproduced area of the cut section of the cylinder has been chosen to be one which is free of pores. However, the overall porosity of the cylinder produced according to the Example was of the order of 30%. The pores of this cylinder were mostly closed pores and are not detrimental to use of the material as a substrate in molten cryolite to be plated with a coating of cerium oxyfluoride.

FIG. 3, part (a) illustrates a cut through an idealized and simplified structure in a plane perpendicular to the orientation of the cylinders 3 representing the metallic current paths. Part (b) of this Figure represents a cut parallel to these cylinders and shows the profile of the surface 5 of the illustrated body which is sectioned into ceramic portions 6 and metallic channels 7 (corresponding respectively to 4 and 3 in FIG. 3(a)).

FIG. 4 is a view corresponding to part (b) of FIG. 3 wherein the metallic channels 7 are indicated with a plus sign indicating positive polarization of these channels. The body is shown immersed in molten cryolite 9 containing cerium ions by addition of cerium compounds, whereby a coating 10 of cerium oxyfluoride has been formed on the surface of the body.

As illustrated in FIG. 3, part (b), the surface 5 of the ceramic portions 6 and the metallic channels 7 is flat. In FIG. 4, the outer ends of the metallic channels 7 have been corroded by the agressive molten cryolite and the metal has been dissolved down to a certain depth from the surface. This dissolution of metal near the surface of the channels 7 promotes the formation of the cerium oxyfluoride coating 10 since the cerium contained in the cerium-aluminum alloy of the channels 7 dissolves in the molten cryolite within the corroded parts of the channels and this increases considerably the local concentration of cerium ions. This high concentration of cerium ions in the cryolite results in promoted deposition of the cerium oxyfluoride coating in and around the channels. The penetration depth of the molten cryolite in the individual channels may vary as illustrated in FIG. 4, depending on local conditions such as the cross-section of the channel, electrical potential of the specific location and so forth.

The ceramic portions 6 of the immersed body are also coated with the same cerium oxyfluoride layer even though the electrical conductivity of these surface portions is smaller than that of the metallic sections. This may be due to the fact that the deposition mechanism of the cerium oxyfluoride onto a positively polarized substrate is not a simple electrodeposition characterized by the deposition of negative charge carriers onto the anode surface, but involves also precipitation of the compound under saturated conditions near the anode. However, it is also possible that deposition centers initiated at the metallic portions of the surface begin to grow and finally overlap until they form a continuous layer.

We claim:

1. A ceramic/metal composite material of at least one ceramic phase and at least one metallic phase, comprising mixed oxides of cerium and at least one of aluminum, nickel, iron and copper in the form of a skeleton of interconnected ceramic oxide grains which skeleton is interwoven with a continuous metallic network of an alloy or intermetallic compound of cerium with at least one of aluminum, nickel, iron and copper.

2. The composite material of claim 1, wherein the metallic phase comprises an alloy or intermetallic compound of cerium and aluminum and optionally at least one of silver and the noble metals, and wherein the ceramic phase comprises mixed oxides or mixtures of oxides of cerium and aluminum and optionally at least one of a sulphide, nitride and phosphide of cerium or aluminum.

3. The composite material of claim 1, wherein the cerium and/or aluminum oxides are doped with fluorine.

4. The composite material of claim 1, wherein the molar ratio between the cerium and the aluminum in the mixed oxide(s) is between 9:1 and 1:9.

5. The composite material of claim 4, wherein the molar ratio between the cerium and the aluminum in the mixed oxide(s) is between 2:1 and 1:5.

6. The composite material of claim 5, wherein the ceramic grains comprise a major amount of grains essentially of the composition $Al_2O_3 \cdot Ce_2O_3$ and a minor amount essentially of the composition $2Al_2O_3 \cdot Ce_2O_3$.

7. The composite material of claim 6, wherein the ceramic grains further comprise a smaller amount of grains essentially of the composition $3Al_2O_3 \cdot 2Ce_2O_3$.

8. The composite material of claim 1, wherein the atomic ratio between Ce and Al in the metallic phase is between 9:1 and 1:9.

9. The composite material of claim 8, wherein the atomic ratio between cerium and aluminum in the metallic phase is between 2:1 and 1:5.

10. The composite material of claim 8, wherein the atomic ratio between cerium and aluminum in the metallic phase is between 1:1 and 1:2.

11. The composite material of claim 1, wherein the ceramic phase comprises dopants for increasing its electrical conductivity and/or its density.

12. The composite material of claim 11, wherein the dopant of the ceramic phase comprises at least one of tantalum, niobium and other pentavalent elements.

13. The composite material of claim 11, wherein the ceramic phase comprises or further comprises dopants selected from yttrium, lanthanum, praseodymium and other rare earth metals.

14. The composite material of claim 1, wherein the cerium in the ceramic phase is present as a mixture of $Ce^{3+}$ and $Ce^{4+}$.

15. The composite material of claim 1, wherein the metallic phase comprises $CeAl_2$.

16. The composite material of claim 1, further comprising inert reinforcing fibers or tissues of carbon, alumina, ceria, zirconia and/or silica.

17. A self sustaining body made of the composite material according to claim 1.

18. The body of claim 17, comprising a protective surface layer.

19. The body according to claim 18, wherein the surface layer comprises cerium oxyfluoride.

20. A dimensionally stable anode of the composite body of claim 18, in a molten salt electrolysis cell in which aluminum is produced.

21. A method of manufacturing the ceramic/metal composite material or body of claim 1, which method comprises establishing a precursor mixture comprising powders of cerium and at least one metal selected from aluminum, nickel, iron and copper, and thereafter reactive sintering, reactive hot-pressing or reactive plasma spraying said precursor mixture, with said precursor mixture optionally containing at least one oxide, fluoride or boride of cerium and/or of at least one metal selected from aluminum, nickel, iron and copper.

22. The method of claim 21, wherein the precursor powders comprise metallic cerium and aluminum and at least one compound selected from $CeO_2$, $Ce_2O_3$, $CeF_3$, $AlF_3$, $AlB_2$, $AlB_{12}$ and Al-silicides.

23. The method of claim 22, wherein the precursor powders further comprise at least one doping additive selected from $Ta_2O_5$, $Nb_2O_5$ and other pentavalent oxides for improvement of the electrical conductivity of the ceramic phase.

24. The method of claim 23, wherein the amount of doping additives in the precursor powder is equivalent to produce a concentration of dopants up to 5 mole % of the produced ceramic phase.

25. The method of claim 24, wherein the amount of doping additives in the precursor powder is equivalent to produce a concentration of dopants up to 1 mole % of the produced ceramic phase.

26. The method of claim 23, wherein the precursor mixture comprises at least one densifying agent selected from $AlF_3$, $CeF_3$, cryolite, $AlB_2$, $AlB_{12}$ $TiB_2$, $CeB_4$, $CeB_6$, TiN, CeN, BN, $SiB_4$ and $SiB_6$.

27. The method of claim 21, wherein the sintering or hot-pressing is carried out at a temperature between 800° C. and 1800° C.

* * * * *